2,479,868

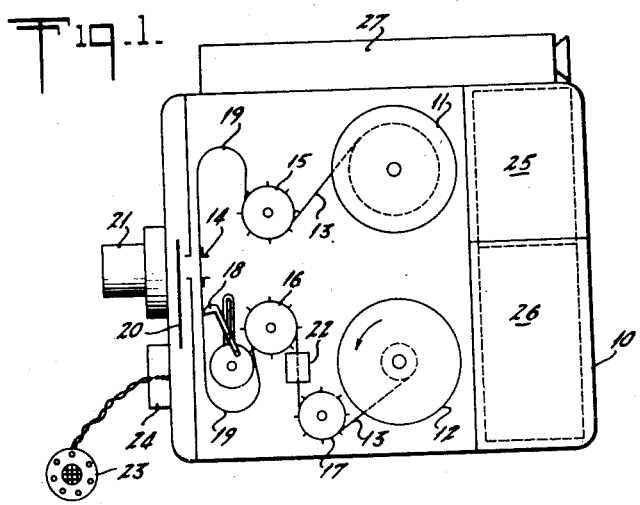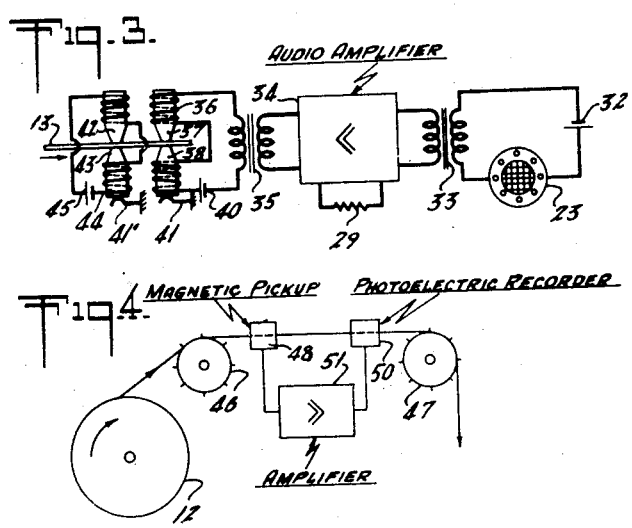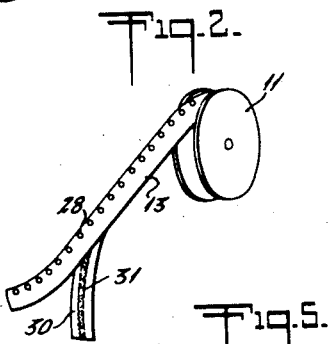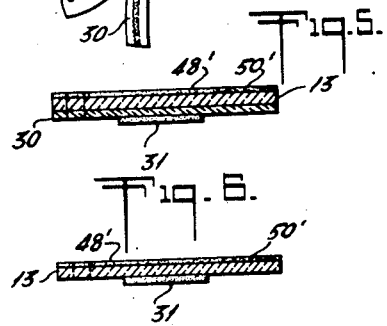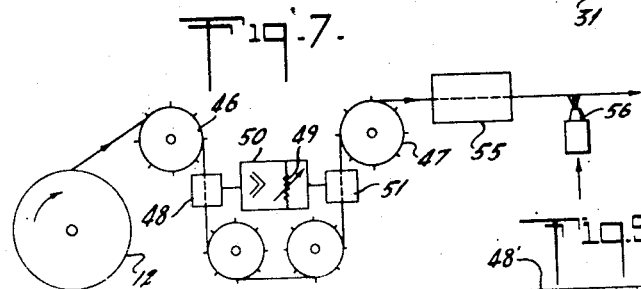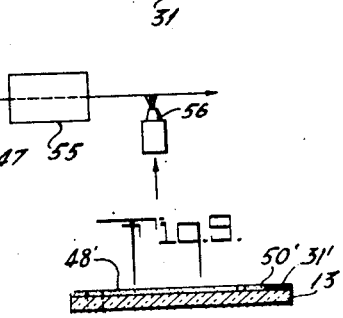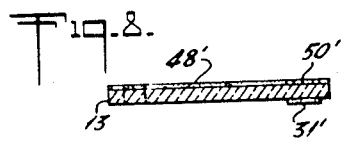
INVENTORS
PETER F. ROSSMANN and
KARL RATH
BY Patented Aug. 23, 1949

UNITED STATES PATENT OFFICE 2,479,868

SOUND MOTION-PICTURE FILM

Peter F. Rossmann, Morristown, N. J., and
Karl Rath, New York, N. Y.

Application April 24, 1947, Serial No. 743,490

4 Claims. (Cl. 88—16.2)

1

The present invention relates to sound films or talking motion pictures, more particularly to a novel method of and means for producing sound-on-film records of the type insuring perfect synchronism between the picture and accompanying sounds.

According to known methods of producing sound films, the sound is recorded photographically upon a narrow strip of the film between the picture areas and the sprocket holes, as in a 35 mm. sound film, or upon a strip along one of the edges of a film in which case only one series of sprocket holes is provided along the opposite edge, as in a 16 mm. sound film.

Whereas the design of sound picture propectors, including those for the popular 16 mm. film, has made great strides in the past and a great number of projectors are available on the market at a not prohibitive cost for both amateur and professional use, the construction of a simple and relatively cheap portable sound camera of small size and bulk has met with great difficulties due to the relative complexity of the photographic recording devices and the necessity of heavy and bulky auxiliary apparatus, such as amplifiers and electric power supply. Thus, the necessary optical equipment, should the amateur want to record is own sound, would cost from two to three times his projector cost, aside from the prohibitive weight and bulk, if ease of operation and portability are desired. This latter requirement applies also to professional or semi-professional use of sound cameras by reporters, travelers, explorers, and all other uses where reduced bulk and size of the equipment are of prime importance.

A forward step in the solution of producing simple and low-priced sound cameras has been made by the recently announced method of using a magnetic in place of a photographic sound track, consisting of a strip of pulverized magnetic material such as metal powder deposited or coated upon the film and utilizing known magnetic recording and reproducing devices, in a substantially analogous manner as with standard photographic recording and reproducing methods.

While such sound-on-film using a magnetic track may be made at a cost far lower than in case of optical recording devices and with increased simplicity, manufacturers are inclined to proceed slowly in order not to make obsolete existing sound projectors for which they are production-tooled and on account of the existence of a large number of professional and amateur sound films provided with photographic sound tracks and being available to the public on both a purchase and rental basis.

Moreover, an advantage of the photographic sound method resides in its ease with which copies or duplications can be made by means of a simple

2 photographic printing process, whereas in the case of magnetic sound, a new track has to be recorded for each film or copy. While this does not constitute a serious limitation for film intended for amateur use where duplication is only rarely desired, it constitutes a great handicap in case of professional or semi-professional films for both entertainment and instructional purposes, where a great number of duplicates are required.

Accordingly, among the objects of the invention is to provide a novel method and means for making sound-on-film which combines the advantages of both the photographic and magnetic recording methods, substantially without the drawbacks or disadvantages of either.

Another object of the invention is to provide a simple and low-cost portable sound camera and a simple method of processing a recorded sound film, whereby the latter may be projected by means of existing sound-on-film projectors.

A further object is to provide novel means for and a method of producing sound-on-film simultaneously with the taking of a picture in a simple and economic manner while retaining a maximum of the equipment at present being used.

With the above and further objects in view, as will appear hereafter, the invention involves generally the provision of a composite photographic and magnetic sound track upon a single picture film, the magnetic track serving exclusively for recording the sound in the camera simultaneously with the picture, whereupon the magnetic track is converted into a photographic track upon the same film. The film is then developed in the normal manner so as to be ready for projection in a standard photographic sound-on-film projector.

The above and further objects of the invention will become more apparent from the following detailed description taken in reference to the accompanying drawing forming part of this specification and wherein:

Figure 1 illustrates schematically a portable motion picture camera embodying sound recording means in accordance with the invention;

Figure 2 is an isometric fractional view showing the construction of one type of composite sound and picture film in accordance with the nvention;

Figure 3 is an electrical circuit diagram of the sound recording system embodied in Figure 1;

Figure 4 illustrates schematically a processing arrangement for converting the magnetic sound track into a photographic track in accordance with the invention;

Figure 5 is a cross-section on an exaggerated scale of the film shown in Figure 2;

Figure 6 is a cross-section through a modified sound film constructed in accordance with the invention;

Figure 7 illustrates schematically a processing arrangement suitable for film of the type according to Figure 6; and Figures 8 and 9 are cross-sections of further modifications of sound films embodying the principle of the invention.

Like reference numerals identify like parts throughout the different views of the drawing.

Referring to Figure 1, there is shown schematically a portable motion picture camera of generally known construction comprising a body or casing 10 having mounted therein film supply and take-up spools 11 and 12, respectively and means for intermittently moving a film 13 through the picture gate 14, said means comprising a number of sprocket guide rollers 15, 16 and 17 and a reciprocating claw mechanism 18, all of usual construction. The film 13 is arranged to form suitable loops 19 to insure a smooth and uniform movement through the sound pick-up head 22 arranged between the sprockets 16 and 17. Item 20 indicates the usual shutter and 21 indicates the lens of the camera. The pick-up head 22 through which the film 13 is passed at uniform speed prior to being wound upon the take-up spool 12 is of the magnetic recording type described in greater detail hereafter. A microphone 23 removably mounted upon the front wall of the camera at 24, and an amplifier 25 and operating battery or power source 26 complete the recording equipment. Item 27 indicates a view finder of any known construction, while other details like the driving motor have been omitted from the drawing for simplicity of illustration and as being unnecessary for the understanding of the invention.

Figure 2 shows one type of composite sound and picture film 13 according to the invention suitable for use in the camera shown in Figure 1. Said film is provided with both magnetic and photographic sound tracks in accordance with the invention and may be of the known 16 mm. sound-on-film type having a single row of sprocket holes 28 along one of its edges, the opposite edge upon the emulsion or upper side in the example shown being reserved for the photographic sound track in accordance with well known practice. In the example shown in Figure 2, the side opposite to the emulsion side of the film is backed by a strip or tape 30 of paper, plastic or the like slightly or removably affixed to the film by a suitable adhesive in such a manner that it may be easily removed or peeled off in the manner indicated in the drawing. In a practical embodiment, the tape 30 may consist of an adhesive faced or coated plastic of the type known as scotch cellulose tape on the market. The tape 30 serves as a separate record carrier and for this purpose has applied to it a magnetic sound track 31 consisting of powdered or finely divided magnetic material. Non-magnetic tapes coated with a magnetic sound track of this type have already become known in connection with magnetic sound recording and reproducing devices.

As the composite film 13 and sound carrier 30 is passed through the recording head 22, the varying sound currents supplied by the microphone 23 will cause the successive areas of the magnetic track 31 to be subjected to varying degrees of magnetization along the length of the track, in such a manner that if the film is subsequently moved through a suitable pick-up or play-back head, the variable magnetic areas will be converted back to corresponding sound currents suitable for reproduction by a loudspeaker or other reproducing device.

In Figure 3 there is shown a complete electrical circuit diagram for a magnetic recording system for a camera such as shown in Figure 1. The microphone 23 is connected in a known manner in series with a suitable current source such as a dry battery 32 and the primary winding of an audio transformer 33 whose secondary winding serves to energize the input of an audio frequency amplifier 34 preferably of the electronic type using miniature or sub-miniature tubes to reduce bulk and weight of the equipment. Such amplifiers are well known from the construction of hearing aids, pocket radios and the like.

The amplified sound currents supplied by the amplifier 34 are applied by way of a further transformer 35 to the exciting or voice coil 36 of a magnetic recording device embodied in the pick-up head 22 of Figure 1, said recording device comprising a magnet having a pair of pole pieces 37 and 38 shaped to taper to a narrow area or gap between which is passed the film 13 in a manner well understood. In order to properly electrically bias the recording device to operate upon the straight line portion of its magnetic characteristic, a biasing voltage source 40 such as a dry battery is shown connected in series with the recording coil 36. The pole pieces 37 and 38 which are displaced slightly laterally to effect longitudinal magnetization of the sound track are resiliently pressed against the film or sound track by means of a spring 41 to reduce the air-gap therebetween and the sound track and to increase the efficiency and quality of recording.

Before the film 13 is passed through the recording device it is advantageously passed through a quenching or erasing device of substantially the same type as the recording device and comprising in the example shown a magnet having a pair of pole pieces 42 and 43 and an exciting coil 44 energized by a constant current supplied by a source 45, such as a dry battery or the like. Pole pieces 42 and 43 are again closely pressed against the film by a spring 41'. The faces of the pole pieces of the recording and erasing magnets may be covered with soft lintless material such as silk paper or velvet or the like to prevent scratching of or damage to the photographic emulsion upon the film in case the sound track 31 overlaps the emulsion or picture area as shown in Figure 2.

In place of using an electromagnet, the erasing action may be effected by a permanent magnet producing a sufficiently strong magnetic saturation field. According to an alternative procedure, the erasing of any magnetic irregularities may be carried out during the manufacture. Since the films are usually sold in metal cans, the latter act as a shield against variable external magnetic fields. In this case, a special quenching or erasing device may be dispensed with in the camera, resulting in further simplification and reduction of weight of the recording device. Other details well known in the art of electromagnetic sound recording have been omitted from the drawing for simplicity and ease of illustration.

Although separate batteries have been shown for the microphone and the recording and erasing devices, it is understood that a single battery or current source may be employed. The latter may also serve to provide the filament and space currents for the amplifier 34, or separate low voltage or high voltage batteries may be used mounted in the space 26 of Figure 1. In order to further reduce the battery space and weight, the plate voltage for the amplifier may be derived from a common low voltage battery by means of a vibrator-rectifier type direct current transformer well known in the art and comprising either a self-interrupting vibrator or an interrupter operated by the driving motor of the camera. Alternatively, all the power sources together or without the amplifier may be combined into a separate unit wearable by a shoulder strap and electrically connectable with the camera through a flexible cord member. The amplifier 34 is advantageously provided with an automatic volume control circuit of any known type as indicated in the drawing by a resistance 29 connecting an element at the output of the amplifier producing a gain control potential with a gain control element at the input of the amplifier. In this manner, a substantially uniform sound output is insured, whereby to enable the photographer to direct all his attention to the operation of the camera and the composition of the picture.

After both picture and sound have been recorded in the manner described, the film is forwarded to the processing station for development in the usual manner. However, contrary to the usual development, the magnetic sound track is first converted into a photographic sound track upon the same film, whereupon the film may be developed in the usual manner to be ready for projection by a standard sound-on-film projector or for duplication by printing copies thereof in any desired number.

Thus, referring to Figure 4, the film from the exposed spool 12 is shown passed by way of guide sprockets 46 and 47 and by means of a suitable constant speed drive first through a magnetic pick-up device 48 which may be similar to the recording or erasing devices shown in Figure 3 and thereafter through a standard photographic sound recorder 50. The sound output currents of the pick-up head 48 are sufficiently amplified by means of an amplifier 51 and applied to the recorder 50. After the photographic sound track has been recorded, the magnetic sound carrier 30 is removed by simply peeling it off the film and the latter developed in the ordinary manner to produce a final photographic sound film ready for use in a standard sound-on-film projector.

The transfer from magnetic to photographic sound is advantageously utilized for editing or monitoring by controlling the volume of the amplifier by means of a suitable volume control resistor 49. An advantage of the invention in this connection is the fact that undesirable parts of the recorded sound may be eliminated by means of a simple erasing magnet and an electric switch for applying the magnetic field and dubbing in other sounds or music by applying corresponding sound curents to the input of the amplifier 51. In the case of photographic recording, this is possible only with elaborate auxiliary devices and by printing a completely new film.

Figure 5 shows the composite sound and picture film in cross-section and on an exaggerated scale. The magnetic sound recorded upon the track 31 applied to the tape or carrier 30 applied upon the lower side of the transparent film base 13 is converted by the pick-up 48 and recorder 50 to a photographic sound record upon the track 50' upon the emulsion side of the film 13, the picture area of the emulsion being indicated at 48'.

According to an alternative method of the invention, as shown in Figure 6, a special tape or sound carrier 30 is dispensed with and the magnetic sound track 31 applied directly to the film 13 opposite to the emulsion. After transfer of the magnetic sound upon track 31 recorded in the camera to the photographic sound track 50' in the manner described, the coating of magnetic material 31 is removed by a mechanical, chemical or any other suitable method. In this case again, all the benefits are obtained by simple and easy recording in the camera and attainment of a normal sound-on-film record suitable for use in existing sound-on-film equipment.

A processing arrangement for film of the type according to Figure 6 is shown schematically in Figure 7. The magnetic sound track 31 may be applied to the film base 13 in substantially the same manner as the photographic emulsion by mixing gelatin or an equivalent carrier or binder with the powdered magnetic material and coating the film in substantially the same manner as in coating the photographic emulsion. The pick-up and recording devices in Figure 7 are similar to those shown in Figure 4. After the magnetic sound has been monitored, edited and converted to photographic sound, the film in the example shown is passed through a tank 55 containing a suitable solution for softening the sound track emulsion or binder, whereupon the latter is removed by either spraying as shown at 56, by scraping, or in any other suitable manner. With the magnetic sound track removed, the film is then passed through the regular developing and processing tanks to yield a final sound-on-film ready for use in a conventional projector equipment.

In Figures 4 and 7, the pick-up device 48 and recording device 50 are shown spaced at a certain distance along the film. It is understood, however, that both may be arranged side by side if the magnetic track 31 instead of being applied to the center of the film, as shown in Figures 5 and 6, is applied as a narrow strip along one edge of the film, such as opposite or next to the photographic track, as shown in Figures 8 and 9. If the pick-up and recording devices are spaced along the film as shown in Figures 4 and 7, the spacing distance is so correlated to the spacing distance between the recording head 22 and the picture gate 7 in the camera in terms of film length, as to result in a properly synchronized photographic sound track upon the finally developed film when the latter is projected by a standard sound-on-film projector.

When using a film provided with both magnetic and photographic sound tracks according to Figures 5 and 6, care should be taken to prevent damage to the photographic emulsion while the film is passed through the erasing, recording and reproducing devices, such as by lining the pole pieces with a soft, lintless material such as felt or velvet. Alternatively, the magnetic sound track 31 may be applied in non-overlapping relation to the picture area 48' as shown in Figure 8, wherein the magnetic track 31' is arranged directly underneath and coincident with the photographic track 50'. In this case, only the portion of the film covered by the tracks 31' and 50' have to be passed through the magnetic devices, as is understood.

According to another feature of the invention, all three areas of the film provided for the picture, the photographic sound track and the magnetic sound track may be separate, such as by applying the magnetic track 31' to a narrow strip along the edge of the film next to the photographic track 50′, as shown in Figure 9. In the latter case, the magnetic track need not be removed after recording the photographic track and may be used for re-recording or monitoring purposes at any later date, as may be desired. Such a film having both an optical and magnetic track may also be used either in a photographic sound projector or in a special such as a silent projector equipped with a simple magnetic pick-up and play-back arrangement.

As pointed out above, the magnetic sound track may consist of any of the known materials such as ferric oxide or nickel-cobalt in the form of a dispersion or powder mixed with a suitable binder. Experience has shown that with coated recording materials of this type, it is possible to record sound frequencies up to 5,000 cycles per second at a speed of the sound track of 8 inches per second, which corresponds to the normal speed of 16 mm. film. This insures sufficient fidelity for both voice and musical reproduction comparable with the quality of known photographic sound records.

The thickness of the magnetic coating need only be of the order of a few mils so that in the case of the track being directly applied to the film as in Figures 6, 8 and 9 the length of film for a camera of given size will be practically the same as in the case of silent film without sound. If a separate sound carrier is provided, as shown in Figures 2 and 5, a paper or plastic having a thickness of the order of about 10 mils may be used, thus resulting in a comparatively small increase in space required by the film compared with silent film without sound.

When using a sound track according to Figures 5 and 6, the width of the track may be increased to improve the quality and efficiency of recording and reproducing, this constituting a further advantage of the invention over magnetic sound films having tracks limited to a narrow strip along the edge of the film. This in turn results in a further reduction of bulk and simplified operation of the equipment required in a camera.

From the foregoing, it will be evident that the invention combines the advantageous features of both magnetic and photographic sound recording, while avoiding the disadvantages of either, aside from the main advantage of reducing the cost and amount of equipment required in a sound film camera and enabling the use of existing sound-on-film projectors and other auxiliary equipment. Thus, the advantages of the optical sound track due to the absence of any direct contact of the recording and reproducing heads with the film and consequent prevention of wear and clogging, are substantially insured by the invention, inasmuch as the film is passed only once through the recording and reproducing devices and is then only used for optical sound pick-up in the projector. The same applies to the ease of duplication by direct contact printing. On the other hand, the invention overcomes in a most simple manner, the disadvantages of the optical recording in a camera consisting in the relatively high cost, complexity of the recording equipment and the impossibility of monitoring the film immediately after recording.

While there have been shown and described a few desirable embodiments of the invention, it is understood that this disclosure is for the purpose of illustration and that various changes in shape, proportion and arrangement of parts, as well as the substitution of equivalent elements for those herein shown and described, may be made without departing from the spirit and scope of the invention as defined in the appended claims. The specification and drawings are accordingly to be regarded in an illustrative rather than a limiting sense.

We claim:
1. A sound motion picture film comprising a transparent film strip having one side coated with a photographic emulsion and a separate sound record carrier constituted by a flexible adhesive faced non-magnetic tape having a width substantially equal to the width of said film strip and a layer of finely divided magnetic materials supported by said tape, said tape being superimposed upon and removably adhering to the opposite side of said film strip with said magnetic layer substantially overlying the picture emulsion areas of the film.

2. A sound motion picture film comprising a transparent film strip having one side coated with a photographic emulsion and a separate sound record carrier constituted by a flexible tape of non-magnetic material of a width substantially equal to the width of said film and having an adhesively coated surface on one side thereof and a layer of finely divided magnetic material applied to its opposite side, said tape being superimposed upon and removably adhering to the opposite side of said film strip with said magnetic layer substantially overlying the picture emulsion areas of the film.

3. A sound motion picture film comprising a transparent film strip having one side coated with a photographic emulsion and a separate sound record carrier constituted by a flexible non-magnetic adhesive faced tape and a layer of finely divided magnetic material supported by said tape, said tap being superimposed upon and removably adhering to the opposite side of said film strip with said magnetic layer substantially overlying the picture emulsion areas of the film.

4. In a sound motion picture film, the combination of a film strip having one side coated with a photographic emulsion and separate sound recording means comprising a flexible adhesive faced non-magnetic tape and a magnetic sound track consisting of finely divided magnetizable material carried by said tape, said tape being superimposed upon and removably adhering to said film strip with said sound track substantially overlying the picture emulsion areas of said film.

PETER F. ROSSMANN.
KARL RATH.

REFERENCES CITED

The following references are of record in the file of this patent:

UNITED STATES PATENTS

| Number | Name | Date |
| --- | --- | --- |
| 1,466,750 | Peterson | Sept. 4, 1923 |
| 1,489,314 | De Forest | Apr. 8, 1924 |
| 1,653,467 | O'Neill | Dec. 20, 1927 |
| 1,679,708 | Bullis | Aug. 7, 1928 |
| 1,808,046 | Kuchenmeister | June 2, 1931 |
| 1,825,598 | Vogt et al. | Sept. 29, 1931 |
| 1,832,097 | Chipman | Nov. 17, 1931 |
| 1,866,712 | Jones | July 12, 1932 |
| 1,883,559 | Chipman | Oct. 18, 1932 |
| 1,883,562 | Chipman | Oct. 18, 1932 |

FOREIGN PATENTS

| Number | Country | Date |
| --- | --- | --- |
| 389,434 | Great Britain | Mar. 16, 1933 |